D. P. JONES.
HAY RAKING ATTACHMENT TO MOWERS.
APPLICATION FILED APR. 11, 1913.

1,138,223.

Patented May 4, 1915.
2 SHEETS—SHEET 1.

INVENTOR
D. P. Jones.

D. P. JONES.
HAY RAKING ATTACHMENT TO MOWERS.
APPLICATION FILED APR. 11, 1913.

1,138,223.

Patented May 4, 1915.

WITNESSES

INVENTOR
D. P. Jones.
BY
, Attorneys.

UNITED STATES PATENT OFFICE.

DAVID PRICE JONES, OF BREDENBURY, SASKATCHEWAN, CANADA.

HAY-RAKING ATTACHMENT TO MOWERS.

1,138,223.  Specification of Letters Patent.  Patented May 4, 1915.

Application filed April 11, 1913. Serial No. 760,566.

*To all whom it may concern:*

Be it known that I, DAVID PRICE JONES, citizen of the Dominion of Canada, residing at Bredenbury, Province of Saskatchewan, Canada, have invented certain new and useful Improvements in Hay-Raking Attachments to Mowers, of which the following is a specification.

This invention relates to devices for raking hay and for like purposes, and has for one of its objects to provide a simply constructed device which may be readily attached to a mower or like machine for the purpose of gathering the product into windrows.

With these and other objects in view, the invention consists in certain novel features of construction which will be hereinafter first fully described and then more particularly pointed out in the claims following the description.

Figure 1:
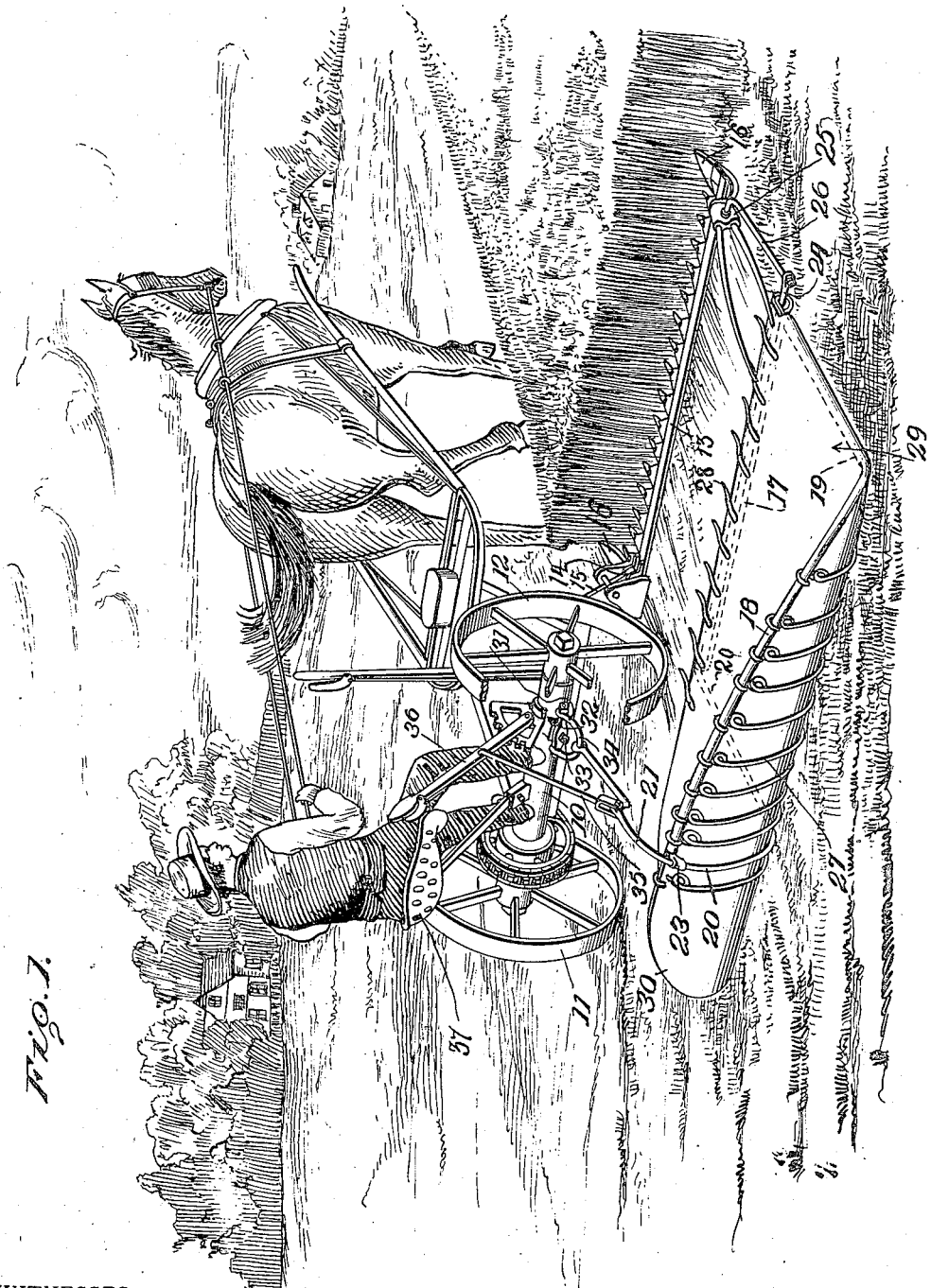
Figure 2:
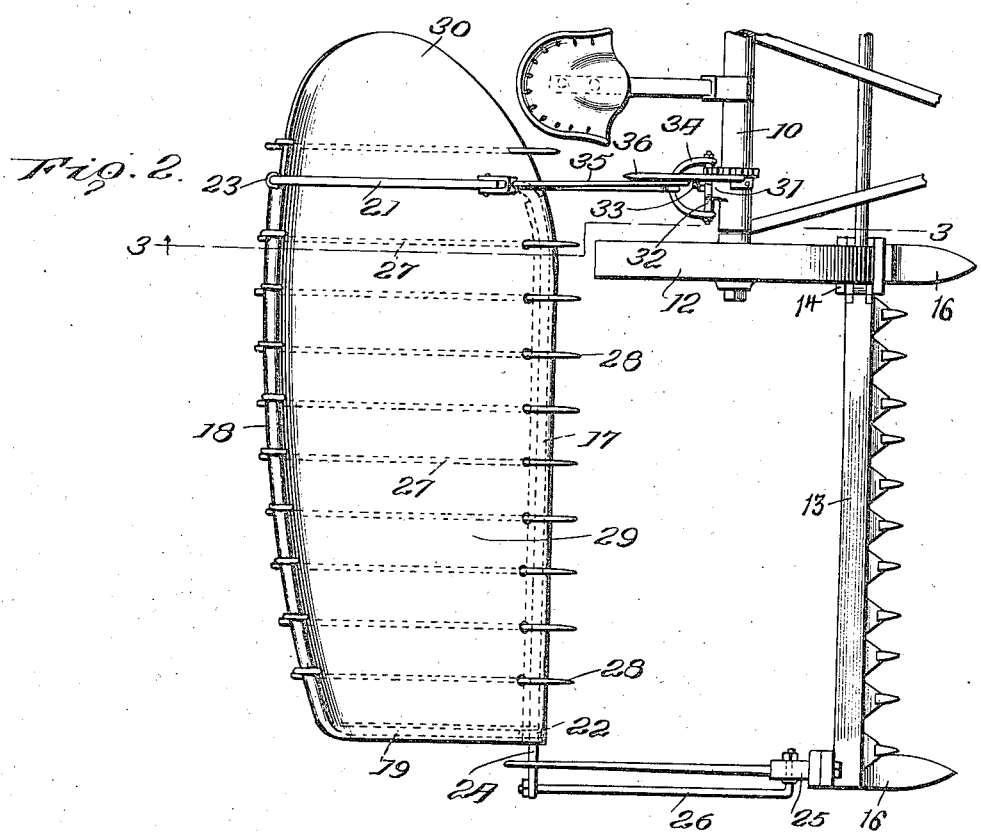
Figure 3:
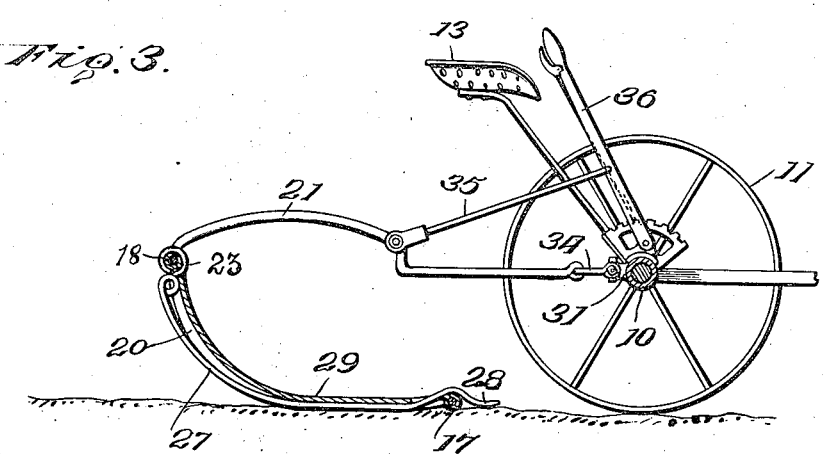

The invention is illustrated in the accompanying drawings, in which:

Figure 1 is a perspective view of a conventional mowing machine with the improved device applied. Fig. 2 is a plan view. Fig. 3 is a section on the line 3—3 of Fig. 2.

Corresponding and like parts are referred to in the following description and indicated in all the views of the accompanying drawings by the same reference characters.

The improved device may be applied without material structural change to mowers and like machines of various forms and constructions, but for the purpose of illustration it is shown applied to a conventional mower in which 10 represents the main axle frame having the bearing wheels 11 and 12. The head frame for the sickle bar is represented conventionally at 13 and having a sickle mechanism 14 on which the sickle is mounted to swing. The pitman is represented at 15 and the grain fingers at 16, these parts being of the usual construction.

The improved device comprises a frame, preferably of metal rods, and includes a lower or forward member 17, an upper or rear member 18, terminal members 19—20. The lower or forward member and the terminal member 20 are preferably in one single piece and extended forwardly at the upper end as represented at 21. The upper or rear member 18 and the outer terminal member 19 are also preferably in one single piece, the end member 19 being connected at 22 to the forward member 17, while the upper member 18 is connected at 23 to the end member 20. The outer end of the forward member 17 of the frame is extended beyond the end member 19 as shown at 24 and is movably connected to any suitable portion of the frame of the mower, preferably to the frame of the grain finger mechanism 25 by a rod 26. The rod 26 is rigidly connected to the extended portion 24 of the rod 17 and pivotally connected to the grain finger mechanism 26.

The rear member 18 of the frame is provided with a plurality of rods 27 which are curved downwardly and forwardly and extend over the forward member 17 and project for a distance in advance of the same in the form of fingers 28. Connected to the frame members 17—18—19—20 is a plate, preferably of sheet metal and designated by the character 29 and constituting a receiver for the material severed by the sickle. The receiver member 29 is rolled at its edges around the members 17—18—19 and is provided with apertures through which the rods 27 extend, as shown. The receiver member 29 is extended for a considerable distance beyond the end member 20 of the supporting frame, as represented at 30. The receiver member 29 is somewhat dish-shaped and is reduced at the inner end where it engages the end member 19 of the frame and merges into the rounded terminal 30. By this means a relatively large receiving device is produced which is located rearwardly of the sickle bar of the mower. The extension 21 of the frame is flexibly united to the frame of the mower, preferably to a bracket 31 extending from the axle casing 10. The connection between the member 21 and the mower frame is necessarily flexible, and an improved fastening device is shown consisting of bar 32 pivoted to the bracket 31 by a bolt 33 and with a yoke 34 swinging upon the terminals of the member 32. The extension 21 is movably coupled to the yoke 34, as shown. Connected to the member 21 is a rod 35 which is attached to a suitable lever 36 convenient to the hand of the driver upon the seat 37 so that the receiver 29—30 may be elevated from the ground to release the load when required.

As before stated the terminals 28 of the rods 27 project for a considerable distance in advance of the forward member 17 of the frame and likewise of the receiver 29 and thus form raker teeth to assist in harvesting the hay as it is severed by the sickle and causing it to be received against the plate 29—30 as the machine is drawn over the ground, and when a sufficient load is obtained the lever 36 is actuated to elevate the receiving device and thus release the load. The lever 36 is then released and the receiving device returned by gravity to its lower or operative position ready to receive another load. The gathering apparatus swings upon the yoke 34 and the forward end of the rod 26, the yieldable arrangement of the yoke and its attachments providing a sufficient flexible connection to permit the movements of the receiving apparatus. The improved device is simple in construction, can be inexpensively manufactured, and applied without material structural change to mowing machines and similar devices of various forms, and may be detached when not required.

Having described the invention, what is claimed as new is:

1. A raking attachment comprising a supporting frame including a forward and rear member, a plurality of bars spaced apart and coupled respectively at one end to the rear frame member and extending in advance of the forward frame member to form gathering teeth, said bars being curved upwardly where they pass the forward frame member, a receiving member bearing over said bars and connected at its edges respectively to the rearward and forward frame members and perforated to receive the upwardly curving portions of the bars, means for swingingly coupling said frame to a mower, and means for elevating said frame.

2. The combination with a mower including the supporting body and a sickle bar head adapted to be elevated, of a frame including rods at the ends, a receiver carried by said frame, a swivel device connected to said supporting body, means for swingingly coupling one of said rods to the sickle bar support, means for coupling the other of said rods to the swivel device, and means for swinging said frame and the receiver carried thereby upwardly.

In testimony whereof I affix my signature in presence of two witnesses.

DAVID PRICE JONES. [L. S.]

Witnesses:
L. H. RAWLINGS,
W. J. DAWSON.